(12) United States Patent
Lin et al.

(10) Patent No.: US 11,493,738 B2
(45) Date of Patent: Nov. 8, 2022

(54) CAMERA OPTICAL LENS INCLUDING FIVE LENSES OF +−−+− REFRACTIVE POWERS

(71) Applicant: AAC Optics Solutions Pte. Ltd., Singapore (SG)

(72) Inventors: Chiacheng Lin, Shenzhen (CN); Jia Chen, Shenzhen (CN); Hiroyuki Teraoka, Osaka (JP)

(73) Assignee: AAC Optics Solutions Pte. Ltd., Singapore (SG)

( * ) Notice: Subject to any disclaimer, the term of this patent is extended or adjusted under 35 U.S.C. 154(b) by 321 days.

(21) Appl. No.: 16/993,246

(22) Filed: Aug. 13, 2020

(65) Prior Publication Data

US 2021/0055523 A1 Feb. 25, 2021

(30) Foreign Application Priority Data

Aug. 19, 2019 (CN) .......................... 201910764606.5

(51) Int. Cl.
*G02B 13/00* (2006.01)
*G02B 9/60* (2006.01)

(52) U.S. Cl.
CPC ........... *G02B 13/0045* (2013.01); *G02B 9/60* (2013.01)

(58) Field of Classification Search
CPC .............................. G02B 13/0045; G02B 9/60
See application file for complete search history.

(56) References Cited

U.S. PATENT DOCUMENTS

2016/0261779 A1* 9/2016 Lin .................... G02B 13/0045

* cited by examiner

*Primary Examiner* — Wen Huang
(74) *Attorney, Agent, or Firm* — W&G Law Group

(57) ABSTRACT

The present invention provides a camera optical lens satisfying following conditions: $0.04 \leq R1/R2 \leq 0.07$, $-3.60 \leq R3/R4 \leq -2.50$, $1.55 \leq R5/R6 \leq 1.80$, $2.80 \leq R9/R10 \leq 3.20$, $0.65 \leq d8/d9 \leq 0.85$, and $0.56 \leq d6/d8 \leq 0.60$; where R1 and R1 respectively denote a curvature radius of an object-side surface and image-side surface of a first lens; R3 and R4 respectively denote a curvature radius of an object-side surface and image-side surface of a second lens; R5 and R6 respectively denote a curvature radius of an object-side surface and image-side surface of a third lens; R9 and R10 respectively denote a curvature radius of an object-side surface and image-side surface of a fifth lens; d6 and d8 respectively denote an on-axis distance from the third lens to the fourth lens and from the fourth lens to the fifth lens; and d9 denotes an on-axis thickness of the fifth lens.

9 Claims, 9 Drawing Sheets

CAMERA OPTICAL LENS INCLUDING FIVE LENSES OF +−−+− REFRACTIVE POWERS

TECHNICAL FIELD

The present disclosure relates to the field of optical lens, in particular, to a camera optical lens suitable for handheld devices, such as smart phones and digital cameras, and imaging devices, such as monitors or PC lenses.

BACKGROUND

With the continuous development of science and technology, the functions of electronic devices are constantly improving. In addition to traditional digital cameras, independent cameras, monitors and the like, portable electronic devices such as tablet computers and mobile phones are also equipped with camera optical lenses, and the lenses in electronic devices such as mobile phones are required to meet the requirements of lightness and thinness while having good imaging quality. Therefore, miniature camera lens with good imaging quality have become a mainstream in the market.

In order to obtain better imaging quality, the lens that is traditionally equipped in mobile phone cameras adopts a three-piece or four-piece lens structure. However, with the development of technology and the increase of the diverse demands of users, and as the pixel area of photosensitive devices is becoming smaller and smaller and the requirement of the camera optical lens 10 on the imaging quality is improving constantly, the five-piece lens structure gradually appear in lens designs. Although the common five-piece lens can have good optical performance, its structure thickness and lens shape setting are still unreasonable, which causes the camera lens to fail to meet the design requirements of wide angle and ultra-thinness while having good optical performance.

Therefore, it is necessary to provide a camera optical lens to solve the above-described problems.

SUMMARY

The present disclosure seeks to provide a camera optical lens to solve the technical issues that the current camera lens fails to meet a design requirement of wide angle and ultra-thinness while having good optical performance.

The technical solution of the present disclosure is as follows:

A camera optical lens is provided. The camera optical lens comprises, from an object-side surface to an image-side surface: a first lens having a positive refractive power; a second lens having a negative refractive power; a third lens having a negative refractive power; a fourth lens having a positive refractive power; and a fifth lens having a negative refractive power; wherein the camera optical lens satisfies following conditions:

$0.04 \leq R1/R2 \leq 0.07$;
$-3.60 \leq R3/R4 \leq -2.50$;
$1.55 \leq R5/R6 \leq 1.80$;
$2.80 \leq R9/R10 \leq 3.20$;
$0.65 \leq d8/d9 \leq 0.85$; and
$0.56 \leq d6/d8 \leq 0.60$;

where R1 denotes a curvature radius of an object-side surface of the first lens; R2 denotes a curvature radius of an image-side surface of the first lens; R3 denotes a curvature radius of an object-side surface of the second lens; R4 denotes a curvature radius of an image-side surface of the second lens; R5 denotes a curvature radius of an object-side surface of the third lens; R6 denotes a curvature radius of an image-side surface of the third lens; R9 denotes a curvature radius of an object-side surface of the fifth lens; R10 denotes a curvature radius of an image-side surface of the fifth lens; d6 denotes an on-axis distance from the third lens to the fourth lens; d8 denotes an on-axis distance from the fourth lens to the fifth lens; and d9 denotes an on-axis thickness of the fifth lens.

As an improvement, the camera optical lens further satisfies following condition:

$2.80 \leq R7/R8 \leq 3.00$;

where R7 denotes a curvature radius of an object-side surface of the fourth lens; and R8 denotes a curvature radius of an image-side surface of the fourth lens.

As an improvement, the camera optical lens further satisfies following condition:

$0.06 \leq d1/TTL \leq 0.19$;
$-2.30 \leq (R1+R2)/(R1-R2) \leq -0.73$; and
$0.42 \leq f1/f \leq 1.30$;

where f denotes a focal length of the camera optical lens; f1 denotes a focal length of the first lens; d1 denotes an on-axis thickness of the first lens; and TTL denotes a total optical length from the object-side surface of the first lens to an image surface of the camera optical lens along an optical axis.

As an improvement, the camera optical lens further satisfies following condition:

$0.03 \leq d3/TTL \leq 0.08$;
$-4.84 \leq f2/f \leq -1.36$; and
$0.22 \leq (R3+R4)/(R3-R4) \leq 0.84$;

where f denotes a focal length of the camera optical lens; f2 denotes a focal length of the second lens; d3 denotes an on-axis thickness of the second lens; and TTL denotes a total optical length from the object-side surface of the first lens to an image surface of the camera optical lens along an optical axis.

As an improvement, the camera optical lens further satisfies following condition:

$0.03 \leq d5/TTL \leq 0.11$;
$1.77 \leq (R5+R6)/(R5-R6) \leq 6.88$; and
$-12.52 \leq f3/f \leq -3.21$;

where f denotes a focal length of the camera optical lens; f3 denotes a focal length of the third lens; d5 denotes an on-axis thickness of the third lens; and TTL denotes a total optical length from the object-side surface of the first lens to an image surface of the camera optical lens along an optical axis.

As an improvement, the camera optical lens further satisfies following condition:

$0.08 \leq d7/TTL \leq 0.26$;
$0.43 \leq f4/f \leq 1.42$; and
$1.01 \leq (R7+R8)/(R7-R8) \leq 3.15$;

where f denotes a focal length of the camera optical lens; f4 denotes a focal length of the fourth lens; R7 denotes a curvature radius of an object-side surface of the fourth lens; R8 denotes a curvature radius of an image-side surface of the fourth lens; d7 denotes an on-axis thickness of the fourth lens; and TTL denotes a total optical length from the object-side surface of the first lens to an image surface of the camera optical lens along an optical axis.

As an improvement, the camera optical lens further satisfies following condition:

$0.05 \leq d9/TTL \leq 0.21$;
$-1.95 \leq f5/f \leq -0.59$; and
$0.96 \leq (R9+R10)/(R9-R10) \leq 3.15$;

where f denotes a focal length of the camera optical lens; f5 denotes a focal length of the fifth lens; and TTL denotes a total optical length from the object-side surface of the first lens to an image surface of the camera optical lens along an optical axis.

As an improvement, the camera optical lens further satisfies following condition:

TTL/IH≤1.50;

where TTL denotes a total optical length from the object-side surface of the first lens to an image surface of the camera optical lens along an optical axis; and IH denotes an image height of the camera optical lens.

As an improvement, the camera optical lens further satisfies following condition:

0.61≤f12/f≤1.93;

where f12 denotes a combined focal length of the first lens and second lens; and f denotes a focal length of the camera optical lens.

The present disclosure is advantageous in: the camera optical lens provided in the present disclosure meets the design requirement of wide angle and ultra-thinness while having good optical performance, and is especially fit for WEB camera lenses and mobile phone camera lens assemblies composed by such camera elements as CCD and CMOS for high pixels.

DETAILED DESCRIPTION OF EMBODIMENTS

The present disclosure will be further illustrated with reference to the accompanying drawings and embodiments.

To make the objects, technical solutions, and advantages of the present disclosure clearer, embodiments of the present disclosure are described in detail with reference to accompanying drawings in the following. A person of ordinary skill in the art can understand that, in the embodiments of the present disclosure, many technical details are provided to make readers better understand the present disclosure. However, even without these technical details and any changes and modifications based on the following embodiments, technical solutions required to be protected by the present disclosure can be implemented.

Embodiment 1

Figure 1:
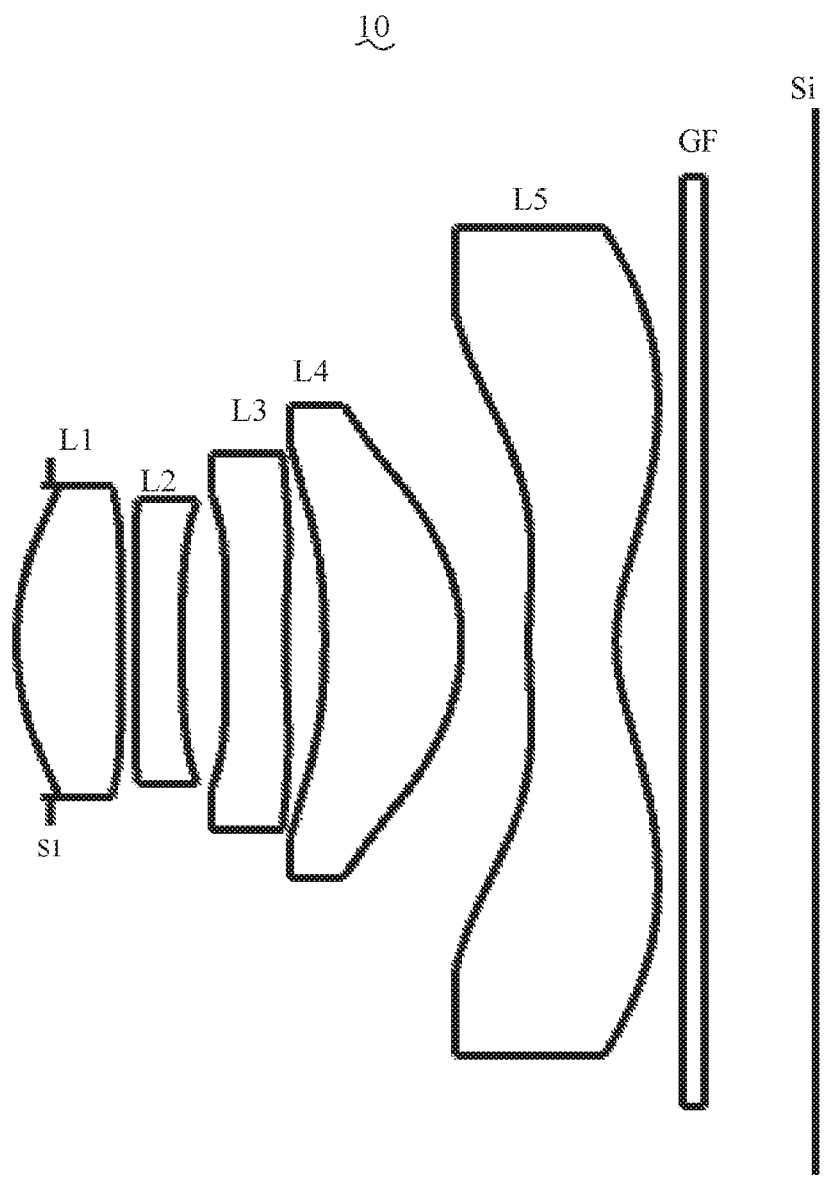
FIG. 1 is a schematic diagram of a structure of a camera optical lens according to Embodiment 1 of the present disclosure.

Referring to FIGS. 1 to 4, the present disclosure provides a camera optical lens 10. FIG. 1 shows the camera optical lens 10 of Embodiment 1 of the present disclosure. The camera optical lens 10 includes 5 lenses. Specifically, the camera optical lens 10 includes, from an object-side surface to an image-side surface: an aperture S1, a first lens L1, a second lens L2, a third lens L3, a fourth lens L4 and a fifth lens L5. In this embodiment, an optical element such as a glass plate GF is arranged between the fifth lens L5 and an image surface Si. Herein, the glass plate GF may either be a glass cover plate or be an optical filter. Alternatively, the glass plate GF may further be arranged at another position in another embodiment.

In this embodiment, the first lens L1 has a positive refractive power; the second lens L2 has a negative refractive power; the third lens L3 has a negative refractive power; the fourth lens L4 has a positive refractive power; and the fifth lens L5 has a negative refractive power.

In this embodiment, a curvature radius of an object-side surface of the first lens is defined as R1, a curvature radius of an image-side surface of the first lens is defined as R2, and the camera optical lens 10 satisfies a condition of 0.04≤R1/R2≤0.07, which specifies a ratio range between the curvature radius of the object-side surface of the first lens and the curvature radius of its image-side surface, thereby specifying a shape of the first lens L1. Within a range specified by the condition, a spherical aberration and a field curvature quantity of the camera optical lens 10 can be effectively balanced.

A curvature radius of an object-side surface of the second lens L2 is defined as R3, a curvature radius of an image-side surface of the second lens L2 is defined as R4, and the camera optical lens 10 satisfies a condition of −3.60≤R3/R4≤−2.50, which specifies a ratio range between the curvature radius of the object-side surface of the second lens L2 and the curvature radius of its image-side surface, thereby specifying a shape of the second lens L2. Within a range specified by the condition, a deflection degree of light passing through the lens can be alleviated and an aberration of the camera optical lens 10 can be effectively reduced.

A curvature radius of an object-side surface of the third lens L3 is defined as R5, a curvature radius of an image-side surface of the third lens L3 is defined as R6, and the camera optical lens 10 satisfies a condition of 1.55≤R5/R6≤1.80, which specifies a ratio range between the curvature radius of the object-side surface of the third lens L3 and the curvature radius of its image-side surface, thereby specifying a shape of the third lens L3. Within a range specified by the condition, it is beneficial to correct an on-axis aberration.

A curvature radius of an object-side surface of the fifth lens L5 is defined as R9, a curvature radius of an image-side surface of the fifth lens L5 is R10, and the camera optical lens 10 satisfies a condition of 2.80≤R9/R10≤3.20, which specifies a ratio range between the curvature radius of the object-side surface of the fifth lens L5 and the curvature radius of its image-side surface, thereby specifying a shape of the fifth lens L5. Within a range specified by the condition, it is beneficial to enhance the performance of the camera optical lens 10.

An on-axis distance from the fourth lens L4 to the fifth lens 15 is defined as d8, an on-axis thickness of the fifth lens L5 is defined as d9, and the camera optical lens 10 satisfies a condition of 0.65≤d8/d9≤0.85, which specifies a ratio of the on-axis distance from the fourth lens L4 to the fifth lens L5 to the on-axis thickness of the fifth lens L5. Within a range specified by the condition, it is beneficial to shorten a total optical length from the object-side surface of the first lens to an image surface of the camera optical lens 10 along an optical axis, thereby an ultra-thinness effect is realized.

An on-axis distance from the third lens L3 to the fourth lens L4 is defined as d6, the on-axis distance from the fourth lens L4 to the fifth lens L5 is defined as d8, and the camera optical lens 10 satisfies a condition of 0.56≤d6/d8≤0.60, which specifies a ratio range between the on-axis distance from the third lens L3 to the fourth lens L4 and the on-axis distance from the fourth lens L4 to the fifth lens L5. Within a range specified by the condition, it is beneficial to shorten the total optical length from the object-side surface of the first lens to the image surface of the camera optical lens 10 along the optical axis, thereby the ultra-thinness effect is realized.

A curvature radius of an object-side surface of the fourth lens L4 is defined as R7, a curvature radius of an image-side surface of the fourth lens L4 is defined as R8, and the camera optical lens 10 satisfies a condition of 2.80≤R7/R8≤3.00, which specifies a ratio range between the curvature radius of the object-side surface of the fourth lens L4 and the curvature radius of its image-side surface, thereby specifying a shape of the fourth lens L4. Within a range specified by the condition, it is beneficial to solve such a problem as an off-axis aberration with a development towards ultra-thin and wide-angle lens.

An on-axis thickness of the first lens L1 is defined as d1, and the total optical length from the object-side surface of the first lens L1 to the image surface Si of the camera optical lens 10 along the optical axis is defined as TTL, and the camera optical lens 10 satisfies a condition of 0.06≤d1/TTL≤0.19, which specifies a ratio of the on-axis thickness of the first lens L1 to the total optical length TTL from the object-side surface of the first lens L1 to the image surface Si of the camera optical lens 10. Within a range specified by the condition, it is beneficial to realize ultra-thin.

The focal length of the camera optical lens 10 is defined as f, the focal length of the first lens L1 is defined as f1, and the camera optical lens 10 satisfies a condition of 0.42≤f1/f≤1.30, which specifies a ratio of the focal length of the first lens L1 to the focal length of the camera optical lens 10. Within a specified range, the first lens has an appropriate positive refractive power, thereby facilitating reducing the aberration of the camera optical lens 10 while facilitating the development towards ultra-thin and wide-angle lens.

The curvature radius of the object-side surface of the first lens L1 is defined as R1, the curvature radius of the image-side surface of the first lens L1 is defined as R2, and the camera optical lens 10 satisfies a condition of −2.30≤(R1+R2)/(R1−R2)≤−0.73, which specifies a ratio of a sum of the curvature radius of the object-side surface and the curvature radius of the image-side surface of the first lens L1 to a difference between the curvature radius of the object-side surface and the curvature radius of the image-side surface of the first lens L1, thereby reasonably controlling the shape of the first lens so that the first lens can effectively correct the spherical aberration of the camera optical lens 10.

An on-axis thickness of the second lens L2 is defined as d3, the total optical length from the object-side surface of the first lens L1 to the image surface Si of the camera optical lens 10 along the optical axis is defined as TTL, and the camera optical lens 10 satisfies a condition of 0.03≤d3/TTL≤0.08, which specifies a ratio of the on-axis thickness of the second lens L2 to the total optical length TTL from the object-side surface of the first lens L1 to the image surface Si of the camera optical lens 10 along the optical axis. Within a range specified by the condition, it is beneficial to realize ultra-thin.

The focal length of the camera optical lens 10 is defined as f, the focal length of the second lens L2 is defined as f2, and the camera optical lens 10 satisfies a condition of −4.84≤f2/f≤−1.36, which specifies a ratio of the focal length of the second lens L2 to the focal length of the camera optical lens 10. By controlling a negative refractive power of the second lens L2 within a reasonable range, correction of the aberration of the camera optical lens 10 can be facilitated.

The curvature radius of the object-side surface of the second lens L2 is defined as R3, and the curvature radius of the image-side surface of the second lens L2 is defined as R4, and the camera optical lens 10 satisfies a condition of 0.22≤(R3+R4)/(R3−R4)≤0.84, which specifies the shape of the second lens L2. Within a range specified by the condition, it helps correct the on-axis aberration with the development towards ultra-thin and wide-angle lens.

The on-axis thickness of the third lens L3 is defined as d5, the total optical length from the object-side surface of the first lens L1 to the image surface Si of the camera optical lens 10 along the optical axis is defined as TTL, and the camera optical lens 10 satisfies a condition of 0.03≤d5/TTL≤0.11, which specifies a ratio of the on-axis thickness of the third lens L3 to the total optical length TTL from the object-side surface of the first lens L1 to the image surface Si of the camera optical lens 10 along the optical axis. It is beneficial to realize ultra-thin within a range specified by the condition.

The focal length of the camera optical lens is defined as f, the focal length of the third lens L3 is defined as f3, and the camera optical lens 10 satisfies a condition of −12.52≤f3/f≤−3.21, which specifies a ratio of the focal length of the third lens L3 to the focal length of the camera optical lens 10. By reasonably distributing the refractive power, the camera optical lens 10 has better imaging quality and lower sensitivity.

The curvature radius of the object-side surface of the third lens L3 is defined as R5, the curvature radius of the image-side surface of the third lens L3 is defined as R6, and the camera optical lens 10 satisfies a condition of 1.77≤(R5+R6)/(R5−R6)≤6.88, which specifies a ratio of a sum of the curvature radius of the object-side surface and the curvature radius of the image-side surface of the third lens L3 to a difference between the curvature radius of the object-side surface and the curvature radius of the image-side surface of the third lens L3. Within a range specified by the condition, the shape of the third lens L3 can be effectively controlled, thereby facilitating shaping of the third lens and avoiding bad shaping and generation of stress due to an overly large surface curvature of the third lens L3

An on-axis thickness of the fourth lens L4 is defined as d7, the total optical length from the object-side surface of the first lens L1 to the image surface Si of the camera optical lens 10 along the optical axis is defined as TTL, and the camera optical lens 10 satisfies a condition of 0.08≤d7/TTL≤0.26, which specifies a ratio of the on-axis thickness of the fourth lens L4 to the total optical length TTL from the object-side surface of the first lens L1 to the image surface Si of the camera optical lens 10 along the optical axis. Within a range specified by the condition, it is beneficial to realize ultra-thin.

The focal length of the camera optical lens 10 is defined as f, the focal length of the fourth lens L4 is defined as f4, and the camera optical lens 10 satisfies a condition of 0.43≤f4/f≤1.42, which specifies a ratio of the focal length of the fourth lens L4 to the focal length of the camera optical lens 10. By reasonably distributing the refractive power, the camera optical lens 10 has better imaging quality and lower sensitivity.

The curvature radius of the object-side surface of the fourth lens L4 is defined as R7, the curvature radius of the image-side surface of the fourth lens L4 is defined as R8, and the camera optical lens 10 satisfies a condition of 1.01≤(R7+R8)/(R7−R8)≤3.15, which specifies a ratio of a sum of the curvature radius of the object-side surface and the curvature radius of the image-side surface of the fourth lens L4 to a difference between the curvature radius of the object-side surface and the curvature radius of the image-side surface of the fourth lens L4, thereby specifying the shape of the fourth lens L4. Within a range specified by the condition, it is beneficial to solve such a problem as the off-axis aberration with the development towards ultra-thin and wide-angle lens.

An on-axis thickness of the fifth lens L5 is defined as d9, and the total optical length from the object-side surface of the first lens L1 to the image surface Si of the camera optical lens 10 along the optical axis is defined as TTL, and the camera optical lens 10 satisfies a condition of 0.05≤d9/TTL≤0.21, which specifies a ratio of the on-axis thickness of the fifth lens L5 to the total optical length TTL from the object-side surface of the first lens L1 to the image surface Si of the camera optical lens 10 along the optical axis. Within a range satisfying the condition, it is beneficial to realize ultra-thin.

The focal length of the camera optical lens 10 is defined as f, the focal length of the fifth lens L5 is defined as f5, and the camera optical lens 10 satisfies a condition of −1.95≤f5/f≤−0.59, which specifies the ratio of the focal length of the fifth lens L5 to the total focal length of the camera optical lens 10, thereby the definition of the fifth lens L5 can effectively make a light angle of the camera lens gentle and reduce a tolerance sensitivity.

The curvature radius of the object-side surface of the fifth lens L5 is defined as R9, the curvature radius of the image-side surface of the fifth lens L5 is defined as R10, and the camera optical lens 10 satisfies a condition of 0.96≤(R9+R10)/(R9−R10)≤3.15, which specifies a ratio of a sum of the curvature radius of the object-side surface and the curvature radius of the image-side surface of the fifth lens L5 to a difference between the curvature radius of the object-side surface and the curvature radius of the image-side surface of the fifth lens L5, thereby specifying the shape of the fifth lens L5. Within a range specified by the condition, it is beneficial to solve such a problem as the off-axis aberration with the development towards ultra-thin and wide-angle lens.

The total optical length from the object-side surface of the first lens L1 to the image surface Si of the camera optical lens 10 along the optical axis is defined as TTL, and an image height of the camera optical lens 10 is defined as IH, and the camera optical lens 10 satisfies a condition of TTL/IH≤1.50, which is beneficial to realize ultra-thin.

The focal length of the camera optical lens is defined as f, a combined focal length of the first lens L1 and second lens L2 is defined as f12, and the camera optical lens 10 satisfies a condition of 0.61≤f12/f≤1.93. Therefore, the aberration and distortion of the camera optical lens can be eliminated, a back focal length of the camera optical lens can be suppressed, and a miniaturization of the camera optical lens can be maintained.

That is, when the above conditions are met, the camera optical lens 10 can meet the design requirements of wide angle and ultra-thinness while having good optical performance. According to the characteristics of the camera optical lens 10, the camera optical lens 10 is especially fit for WEB camera lenses and mobile phone camera lens assemblies composed by such camera elements as CCD and CMOS for high pixels.

In addition, in the camera optical lens 10 provided in the present disclosure, the surface of each lens can be set as an aspheric surface. The aspheric surface is easily made into a shape other than a spherical surface, and more control variables are obtained to absorb the aberration, thereby decreasing the number of lenses used. Therefore, a total length of the camera optical lens 10 can be effectively reduced. In the embodiments of the present disclosure, both the object-side surface and the image-side surface of each lens are aspheric.

The symbols recorded in each example will be described as follows. The focal length, on-axis distance, curvature radius, on-axis thickness, inflexion point position, and arrest point position are all in units of mm.

TTL: total optical length (from the object-side surface of the first lens to an image surface of the camera optical lens along an optical axis) in mm.

Preferably, inflexion points and/or arrest points can be arranged on the object-side surface and/or the image-side surface of the lens, so as to satisfy the demand for high quality imaging. The description below can be referred for specific implementations.

FIG. 1 is a schematic diagram of a structure of a camera optical lens 10 according to Embodiment 1 of the present disclosure. The following show a design data of the camera optical lens 10 according to Embodiment 1 of the present disclosure.

The design data of the camera optical lens 10 in Embodiment 1 of the present disclosure are shown in Table 1 and Table 2. It should be noted that in this embodiment, the distance, radius and center thickness are all in units of millimeters (mm).

TABLE 1

| | R | | d | nd | | vd |
|---|---|---|---|---|---|---|
| S1 | ∞ | d0= | −0.175 | | | |
| R1 | 1.419 | d1= | 0.541 | nd1 | 1.5444 v1 | 55.82 |
| R2 | 25.403 | d2= | 0.083 | | | |
| R3 | −18.811 | d3= | 0.236 | nd2 | 1.6610 v2 | 20.53 |
| R4 | 5.919 | d4= | 0.224 | | | |
| R5 | 7.414 | d5= | 0.319 | nd3 | 1.6153 v3 | 25.94 |
| R6 | 4.610 | d6= | 0.204 | | | |
| R7 | −3.255 | d7= | 0.713 | nd4 | 1.5444 v4 | 55.82 |
| R8 | −1.129 | d8= | 0.352 | | | |
| R9 | 2.919 | d9= | 0.453 | nd5 | 1.5346 v5 | 55.69 |
| R10 | 0.956 | d10= | 0.350 | | | |
| R11 | ∞ | d13= | 0.110 | ndg | 1.5168 vg | 64.17 |
| R12 | ∞ | d14= | 0.582 | | | |

In the above table, meanings of various symbols will be described as follows.

S1: aperture;

R: curvature radius of an optical surface;

R1: curvature radius of the object-side surface of the first lens L1;

R2: curvature radius of the image-side surface of the first lens L1;

R3: curvature radius of the object-side surface of the second lens L2;

R4: curvature radius of the image-side surface of the second lens L2;

R5: curvature radius of the object-side surface of the third lens L3;

R6: curvature radius of the image-side surface of the third lens L3;

R7: curvature radius of the object-side surface of the fourth lens L4;

R8: curvature radius of the image-side surface of the fourth lens L4;

R9: curvature radius of the object-side surface of the fifth lens L5;

R10: curvature radius of the image-side surface of the fifth lens L5;

R11: curvature radius of the object-side surface of the optical filter GF;

R12: curvature radius of the image-side surface of the optical filter GF;

d: on-axis thickness of a lens, an on-axis distance between adjacent lenses;

d0: on-axis distance from the aperture S1 to the object-side surface of the first lens L1;

d1: on-axis thickness of the first lens L1;

d2: on-axis distance from the image-side surface of the first lens L1 to the object-side surface of the second lens L2;

d3: on-axis thickness of the second lens L2;

d4: on-axis distance from the image-side surface of the second lens L2 to the object-side surface of the third lens L3;

d5: on-axis thickness of the third lens L3;

d6: on-axis distance from the image-side surface of the third lens L3 to the object-side surface of the fourth lens L4;

d7: on-axis thickness of the fourth lens L4;

d8: on-axis distance from the image-side surface of the fourth lens L4 to the object-side surface of the fifth lens L5;

d9: on-axis thickness of the fifth lens L5;

d10: on-axis distance from the image-side surface of the fifth lens L5 to the object-side surface of the optical filter GF;

d11: on-axis thickness of the optical filter GF;

d12: on-axis distance from the image-side surface of the optical filter GF to the image surface Si;

nd: refractive index of the d line;

nd1: refractive index of the first lens L1;

nd2: refractive index of the second lens L2;

nd3: refractive index of the third lens L3;

nd4: refractive index of the fourth lens L4;

nd5: refractive index of the fifth lens L5;

ndg: refractive index of the optical filter GF;

vd: abbe number;

v1: abbe number of the first lens L1;

v2: abbe number of the second lens L2;

v3: abbe number of the third lens L3;

v4: abbe number of the fourth lens L4;

v5: abbe number of the fifth lens L5;

vg: abbe number of the optical filter GF.

TABLE 2

| | Conic coefficient | Aspheric surface coefficients | | | |
|---|---|---|---|---|---|
| | k | A4 | A6 | A8 | A10 |
| R1 | −1.7763E+01 | 7.0217E−01 | −2.0308E+00 | 4.8646E+00 | −7.0437E+00 |
| R2 | −1.3831E+04 | −2.1603E−02 | −4.0746E−01 | 1.8370E+00 | −4.8879E+00 |
| R3 | 2.0576E+02 | −3.9786E−02 | 4.4662E−01 | −6.6149E−01 | 8.6970E−01 |
| R4 | −9.6675E+01 | 2.5482E−02 | 2.0083E−01 | 2.3137E+01 | 5.4382E+00 |
| R5 | 1.6504E+01 | −2.8677E−01 | −1.0251E+00 | 7.4261E+00 | −2.7797E+01 |
| R6 | −2.5082E+02 | 9.5426E−02 | −1.2911E+00 | 4.1918E+00 | −8.2104E+00 |
| R7 | 1.3999E+00 | −2.2606E−02 | 1.4120E−02 | −5.1810E−01 | 1.3305E+00 |
| R8 | −2.4837E+00 | −2.3101E−01 | 4.5549E−01 | −9.5226E−01 | 1.2404E+00 |
| R9 | −1.0415E+02 | −3.0592E−01 | 2.0500E−01 | −8.6095E−02 | 2.3750E−02 |
| R10 | −6.2920E+00 | −1.4540E−01 | 8.9576E−02 | −4.1054E−02 | 1.2404E−02 |

| | Aspheric surface coefficients | | | | |
|---|---|---|---|---|---|
| | A12 | A14 | A16 | A18 | A20 |
| R1 | −2.1361E−01 | 2.3558E+01 | −4.8721E+01 | 4.5382E+01 | −1.6900E+01 |
| R2 | 2.4672E+00 | 1.9739E+01 | −5.7973E+01 | 6.8491E+01 | −3.0852E+01 |
| R3 | −3.9565E+00 | 1.5368E+01 | −3.2603E+01 | 3.7477E+01 | −1.7988E+01 |
| R4 | −5.2581E+01 | 2.0073E+02 | −3.9993E+02 | 4.1452E+02 | −1.7662E+02 |
| R5 | 5.7857E+01 | −5.3768E+01 | −1.4376E+01 | 6.9248E+01 | −3.8940E+01 |
| R6 | 8.1102E+00 | 1.9616E+00 | −1.3362E+01 | 1.2012E+01 | −3.5678E+00 |
| R7 | −1.7474E+00 | 2.5865E+00 | −2.8070E+00 | 1.3117E+00 | −1.5423E−01 |
| R8 | −8.7956E−01 | 1.8709E−01 | 2.5694E−01 | −2.2050E−01 | 5.1903E−02 |
| R9 | −2.4879E−03 | −5.3957E−04 | 1.9026E−04 | −2.2397E−05 | 1.3076E−06 |
| R10 | −2.3319E−03 | 2.2114E−04 | 9.8162E−07 | −1.9889E−06 | 1.1091E−07 |

In table 2, K is a conic coefficient, and A4, A6, A8, A10, A12, A14, A16, A18 and A20 are aspheric surface coefficients.

It should be noted that in this embodiment, an aspheric surface of each lens preferably uses the aspheric surfaces shown in the following condition. However, the specific form of the following condition is only an example, which is not limited to the aspherical polynomials form shown in the condition.

$$Y = (x^2/R)/\{1+[1-(1+k)(x^2/R^2)]^{1/2}\} + A_4 x^4 + A_6 x^6 + A_8 x^8 + A_{10} x^{10} + A_{12} x^{12} + A_{14} x^{14} + A_{16} x^{16} + A_{18} x^{18} + A_{18} x^{18}$$

Table 3 and Table 4 show design data of inflexion points and arrest points of the camera optical lens 10 according to Embodiment 1 of the present disclosure. P1R1 and P1R2 represent the object-side surface and the image-side surface of the first lens L1, P2R1 and P2R2 represent the object-side surface and the image-side surface of the second lens L2, P3R1 and P3R2 represent the object-side surface and the image-side surface of the third lens L3, P4R1 and P4R2 represent the object-side surface and the image-side surface of the fourth lens L4, and P5R1 and P5R2 represent the object-side surface and the image-side surface of the fifth lens L5. The data in the column named "inflexion point position" refer to vertical distances from inflexion points arranged on each lens surface to the optic axis of the camera optical lens 10. The data in the column named "arrest point position" refer to vertical distances from arrest points arranged on each lens surface to the optical axis of the camera optical lens 10.

TABLE 3

|  | Number(s) of inflexion points | Inflexion point position 1 | Inflexion point position 2 | Inflexion point position 3 |
|---|---|---|---|---|
| P1R1 | 1 | 0.705 | | |
| P1R2 | 1 | 0.185 | | |
| P2R1 | 1 | 0.325 | | |
| P2R2 | 0 | | | |
| P3R1 | 2 | 0.185 | 0.775 | |
| P3R2 | 2 | 0.295 | 0.865 | |
| P4R1 | 3 | 0.745 | 0.885 | 1.015 |
| P4R2 | 3 | 0.925 | 1.145 | 1.225 |
| P5R1 | 2 | 0.225 | 1.265 | |
| P5R2 | 1 | 0.485 | | |

TABLE 4

|  | Number(s) of arrest points | Arrest point position 1 |
|---|---|---|
| P1R1 | 0 | |
| P1R2 | 1 | 0.315 |
| P2R1 | 1 | 0.485 |
| P2R2 | 0 | |
| P3R1 | 1 | 0.315 |
| P3R2 | 1 | 0.525 |
| P4R1 | 0 | |
| P4R2 | 0 | |
| P5R1 | 1 | 0.435 |
| P5R2 | 1 | 1.255 |

Figure 2:
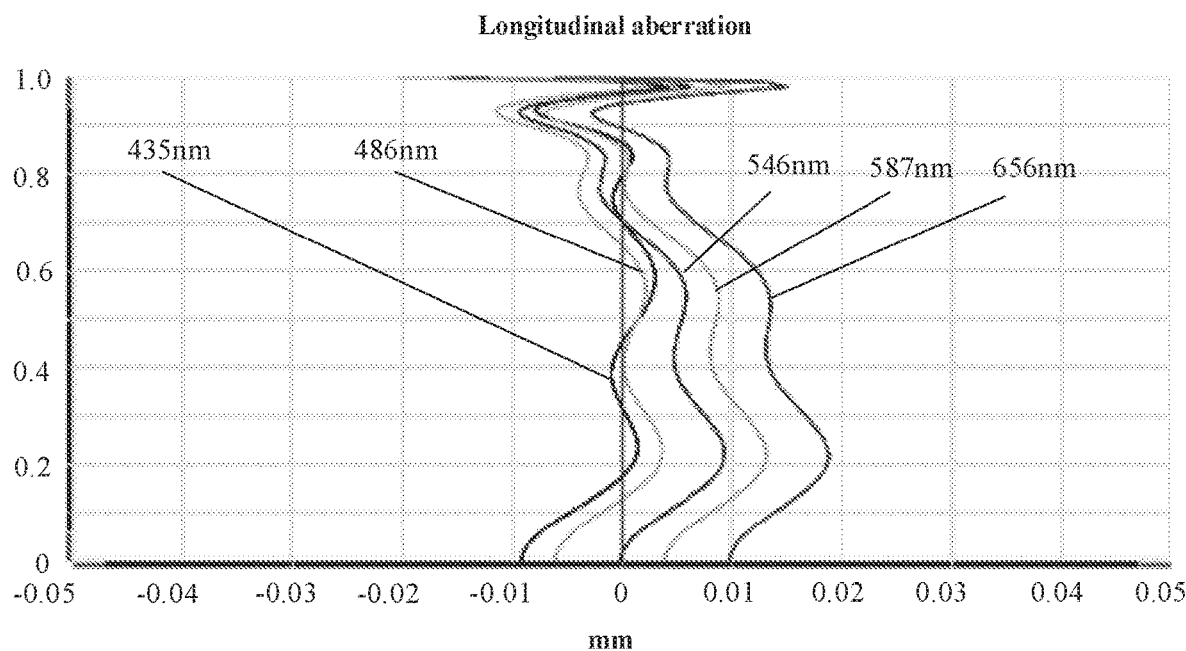
FIG. 2 is a schematic diagram of a longitudinal aberration of the camera optical lens shown in FIG. 1.
Figure 3:
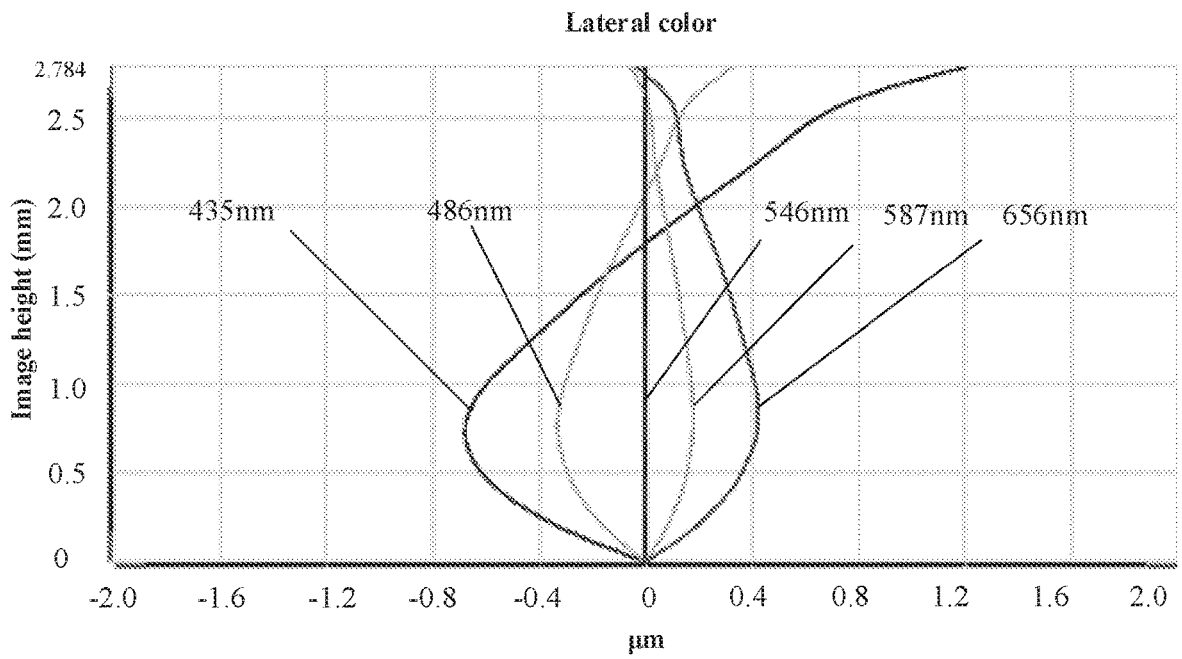
FIG. 3 is a schematic diagram of a lateral color of the camera optical lens shown in FIG. 1.
Figure 4:
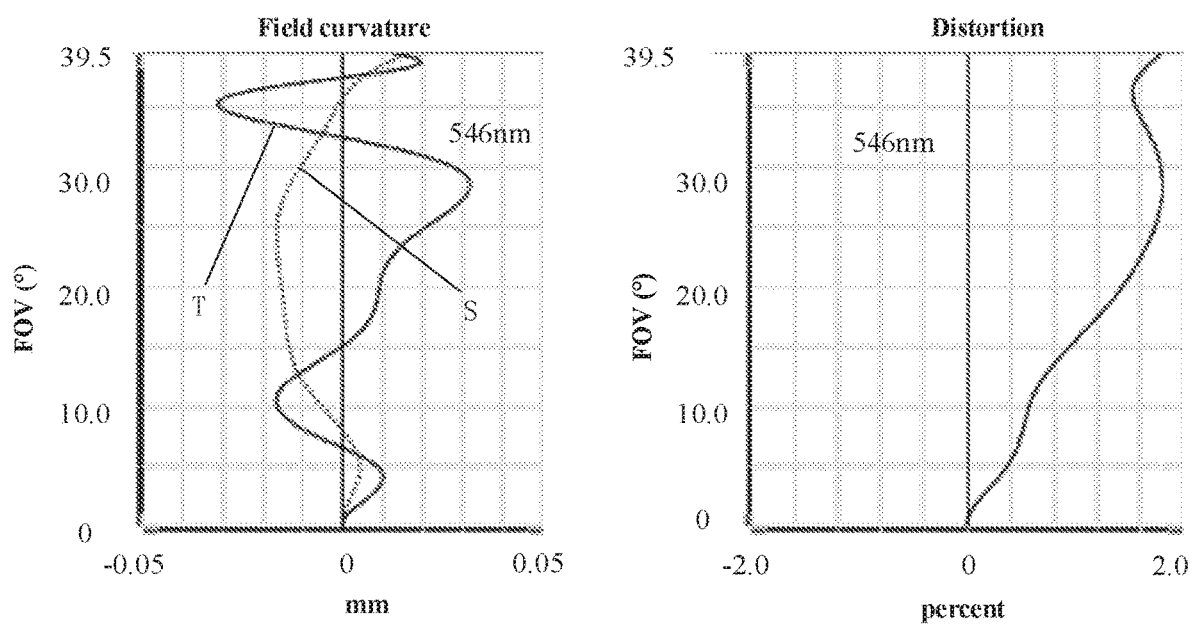
FIG. 4 is a schematic diagram of a field curvature and a distortion of the camera optical lens shown in FIG. 1.

FIG. 2 and FIG. 3 illustrate a longitudinal aberration and a lateral color with wavelengths of 435 nm, 486 nm, 546 nm, 587 nm and 656 nm after passing the camera optical lens 10 according to Embodiment 1, respectively. FIG. 4 illustrates a field curvature and a distortion with a wavelength of 546 nm after passing the camera optical lens 10 according to Embodiment 1. A field curvature S in FIG. 4 is a field curvature in a sagittal direction, and T is a field curvature in a tangential direction.

Table 13 in the following shows various values of Embodiments 1, 2, 3 and values corresponding to parameters which are specified in the above conditions.

As shown in Table 13, Embodiment 1 satisfies the above conditions.

In this Embodiment, an entrance pupil diameter of the camera optical lens 10 is 1.639 mm, an image height of 1.0H is 2.784 mm, a FOV (field of view) in a diagonal direction is 79.00°. Thus, the camera optical lens 10 has a wide-angle and is ultra-thin. Its on-axis and off-axis aberrations are fully corrected, thereby achieving excellent optical characteristics.

Embodiment 2

Figure 5:
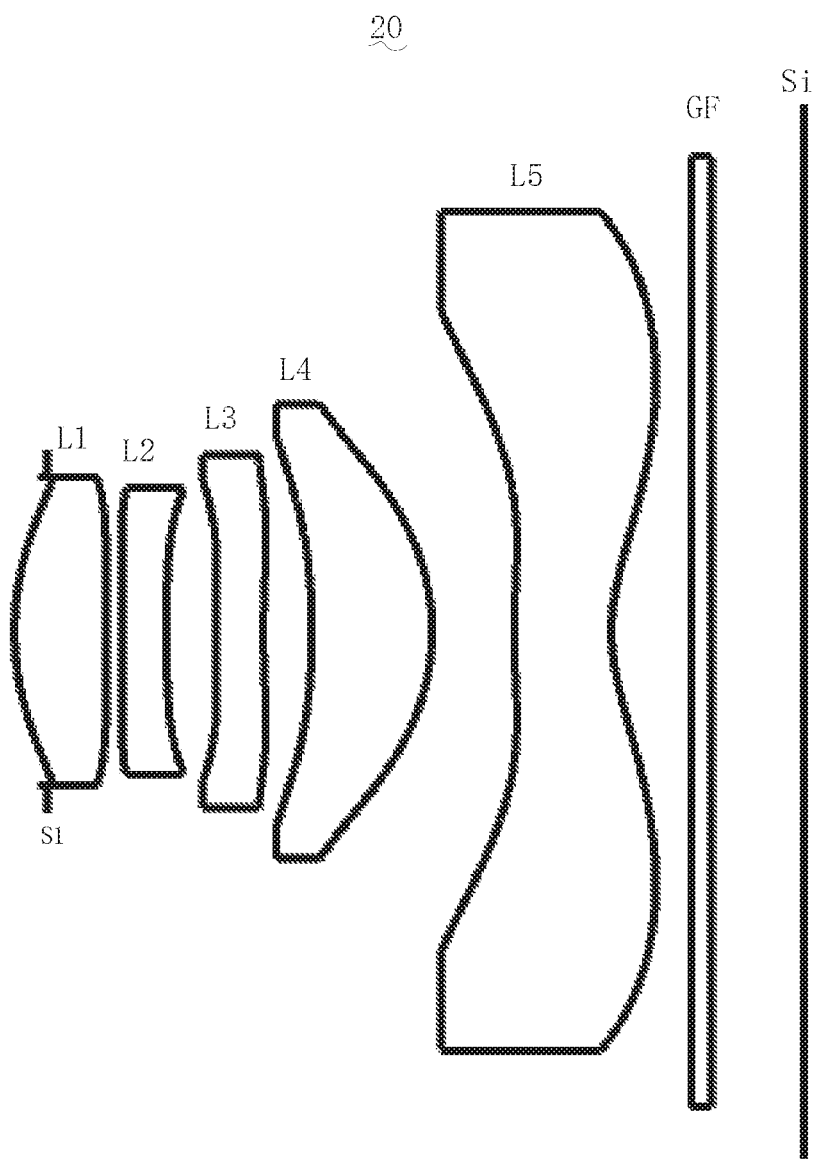
FIG. 5 is a schematic diagram of a structure of a camera optical lens according to Embodiment 2 of the present disclosure.

FIG. 5 is a schematic structural diagram of a camera optical lens 20 in Embodiment 2. Embodiment 2 is basically the same as Embodiment 1 and involves symbols in the following tables having the same meanings as Embodiment 1, so the same parts are not repeated here, and only the differences therebetween will be described in the following.

Table 5 and Table 6 show design data of a camera optical lens 20 in Embodiment 2 of the present disclosure.

TABLE 5

|  | R | d | nd | vd |
|---|---|---|---|---|
| S1 | ∞ | d0= −0.175 | | |
| R1 | 1.472 | d1= 0.483 | nd1 1.5444 | v1 55.82 |
| R2 | 30.655 | d2= 0.085 | | |
| R3 | −21.003 | d3= 0.230 | nd2 1.6610 | v2 20.53 |
| R4 | 5.916 | d4= 0.261 | | |
| R5 | 5.973 | d5= 0.250 | nd3 1.6153 | v3 25.94 |
| R6 | 3.835 | d6= 0.255 | | |
| R7 | −3.606 | d7= 0.633 | nd4 1.5444 | v4 55.82 |
| R8 | −1.210 | d8= 0.431 | | |
| R9 | 2.812 | d9= 0.512 | nd5 1.5346 | v5 55.69 |
| R10 | 0.997 | d10= 0.419 | | |
| R11 | ∞ | d13= 0.110 | ndg 1.5168 | vg 64.17 |
| R12 | ∞ | d14= 0.482 | | |

TABLE 6

| | Conic coefficient | Aspheric surface coefficients | | | |
|---|---|---|---|---|---|
| | k | A4 | A6 | A8 | A10 |
| R1 | −1.9110E+01 | 6.7543E−01 | −2.0293E+00 | 4.8417E+00 | −7.0267E+00 |
| R2 | −1.3831E+04 | −7.1596E−02 | −2.1120E−01 | 1.5887E+00 | −4.8844E+00 |
| R3 | 1.2557E+02 | −6.0781E−02 | 6.0444E−01 | −7.6245E−01 | 7.6024E−01 |
| R4 | −1.8944E+02 | 8.1031E−02 | 1.8492E−01 | 1.7536E−01 | 5.5568E+00 |
| R5 | −2.5033E+01 | −3.2165E−01 | −1.0173E+00 | 7.5799E+00 | −2.7968E+01 |
| R6 | −1.4739E+02 | 2.0312E−02 | −1.2467E+00 | 4.2348E+00 | −8.2998E+00 |
| R7 | 2.9860E+00 | −4.6347E−02 | 8.6229E−02 | −5.5891E−01 | 1.2321E+00 |
| R8 | −2.3355E+00 | −2.3048E−01 | 4.6303E−01 | −9.5366E−01 | 1.2358E+00 |
| R9 | −8.3188E+01 | −2.9044E−01 | 2.0264E−01 | −8.7498E−02 | 2.3422E−02 |
| R10 | −6.0988E+00 | −1.3985E−01 | 8.8940E−02 | −4.1072E−02 | 1.2429E−02 |

TABLE 6-continued

| | Aspheric surface coefficients | | | | |
|---|---|---|---|---|---|
| | A12 | A14 | A16 | A18 | A20 |
| R1 | −1.6131E−01 | 2.3550E+01 | −4.8881E+01 | 4.5170E+01 | −1.6489E+01 |
| R2 | 2.8613E+00 | 1.9870E+01 | −5.8851E+01 | 6.7127E+01 | −2.8527E+01 |
| R3 | −3.8917E+00 | 1.5453E+01 | −3.2891E+01 | 3.6777E+01 | −1.6852E+01 |
| R4 | −5.2516E+01 | 2.0045E+02 | −4.0055E+02 | 4.1395E+02 | −1.7538E+02 |
| R5 | 5.7784E+01 | −5.3179E+01 | −1.3854E+01 | 6.8108E+01 | −3.9915E+01 |
| R6 | 8.0496E+00 | 2.0742E+00 | −1.3250E+01 | 1.1965E+01 | −3.6414E+00 |
| R7 | −1.7932E+00 | 2.6420E+00 | −2.7020E+00 | 1.3701E+00 | −2.5394E−01 |
| R8 | −8.8069E−01 | 1.8693E−01 | 2.5622E−01 | −2.2123E−01 | 5.3016E−02 |
| R9 | −2.4965E−03 | −5.1496E−04 | 1.9887E−04 | −2.1385E−05 | 6.8742E−07 |
| R10 | −2.3295E−03 | 2.2028E−04 | 6.1980E−07 | −2.0295E−06 | 1.2669E−07 |

Table 7 and table 8 show design data of inflexion points and arrest points of each lens of the camera optical lens 20 lens according to Embodiment 2 of the present disclosure.

TABLE 7

| | Number(s) of inflexion points | Inflexion point position 1 | Inflexion point position 2 | Inflexion point position 3 |
|---|---|---|---|---|
| P1R1 | 1 | 0.675 | | |
| P1R2 | 1 | 0.155 | | |
| P2R1 | 1 | 0.305 | | |
| P2R2 | 0 | | | |
| P3R1 | 1 | 0.195 | | |
| P3R2 | 2 | 0.275 | 0.805 | |
| P4R1 | 2 | 0.835 | 0.915 | |
| P4R2 | 3 | 0.955 | 1.125 | 1.185 |
| P5R1 | 2 | 0.245 | 1.495 | |
| P5R2 | 1 | 0.505 | | |

TABLE 8

| | Number of arrest points | Arrest point position 1 |
|---|---|---|
| P1R1 | 0 | |
| P1R2 | 1 | 0.265 |
| P2R1 | 1 | 0.435 |
| P2R2 | 0 | |
| P3R1 | 1 | 0.325 |
| P3R2 | 1 | 0.485 |
| P4R1 | 0 | |
| P4R2 | 0 | |
| P5R1 | 1 | 0.465 |
| P5R2 | 1 | 1.335 |

Figure 6:
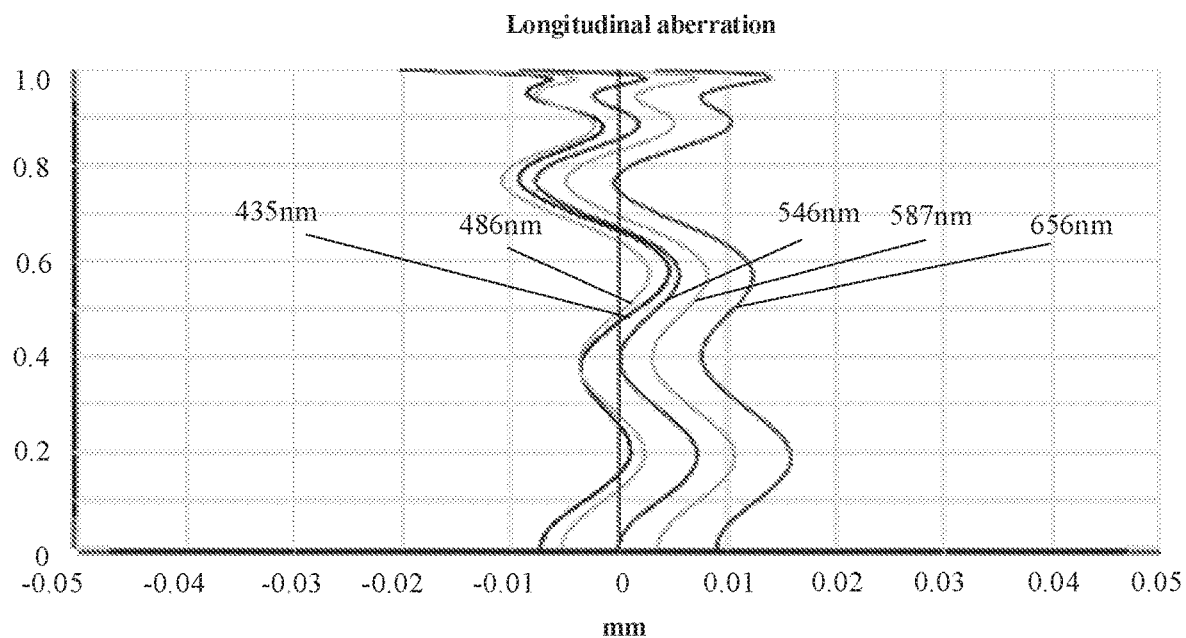
FIG. 6 is a schematic diagram of a longitudinal aberration of the camera optical lens shown in FIG. 5.
Figure 7:
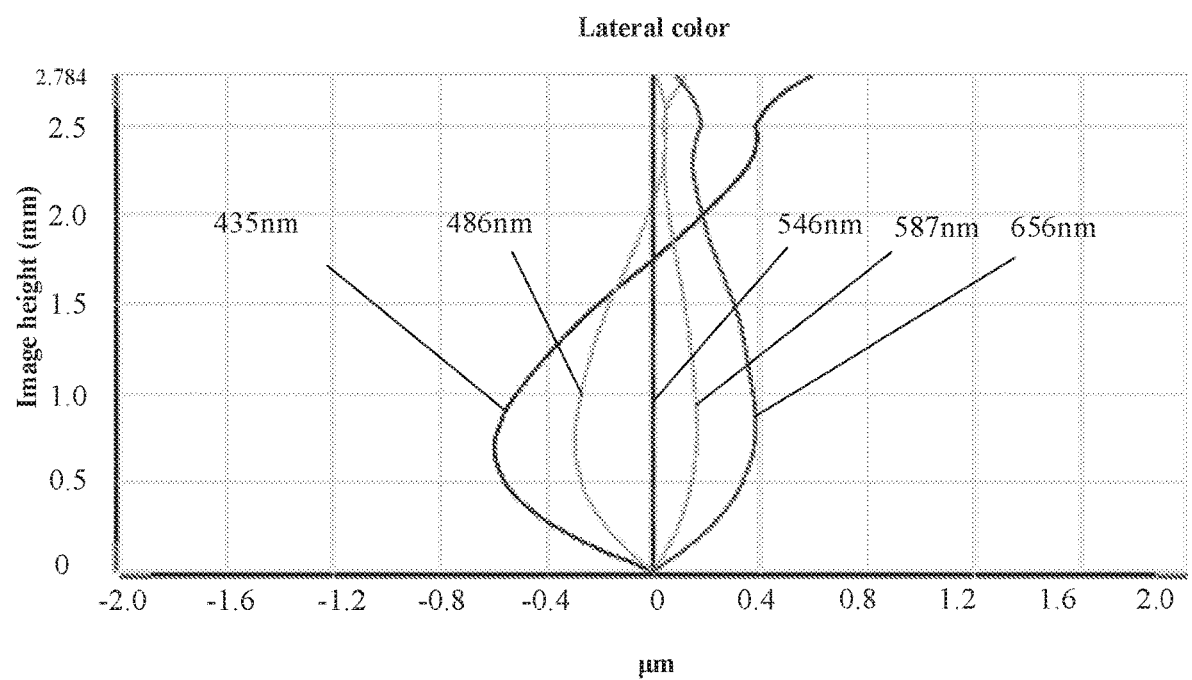
FIG. 7 is a schematic diagram of a lateral color of the camera optical lens shown in FIG. 5.
Figure 8:
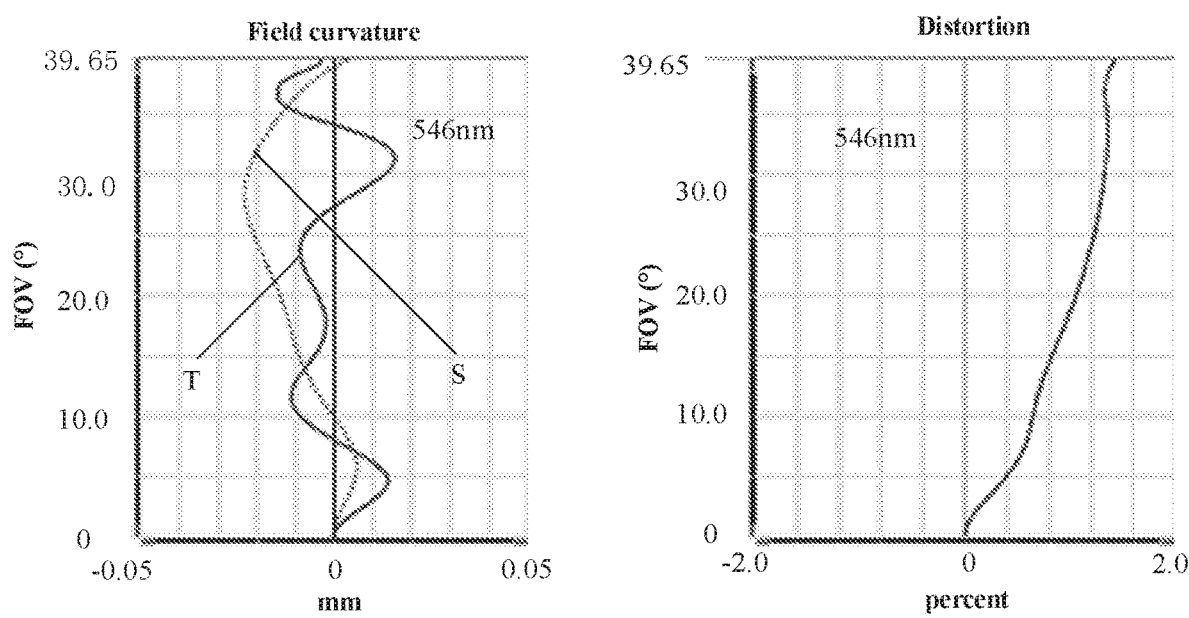
FIG. 8 is a schematic diagram of a field curvature and a distortion of the camera optical lens shown in FIG. 5.

FIG. 6 and FIG. 7 illustrate a longitudinal aberration and a lateral color with wavelengths of 435 nm, 486 nm, 546 nm, 587 nm and 656 nm after passing the camera optical lens 20 according to Embodiment 2, respectively. FIG. 8 illustrates a field curvature and a distortion with a wavelength of 546 nm after passing the camera optical lens 20 according to Embodiment 2. A field curvature S in FIG. 8 is a field curvature in a sagittal direction, and T is a field curvature in a tangential direction.

As shown in Table 13, Embodiment 2 satisfies the above conditions.

In this Embodiment, an entrance pupil diameter of the camera optical lens 20 is 1.639 mm, an image height of 1.0H is 2.784 mm, a FOV (field of view) in a diagonal direction is 79.30°. Thus, the camera optical lens 20 has a wide-angle and is ultra-thin. Its on-axis and off-axis aberrations are fully corrected, thereby achieving excellent optical characteristics.

Embodiment 3

Figure 9:
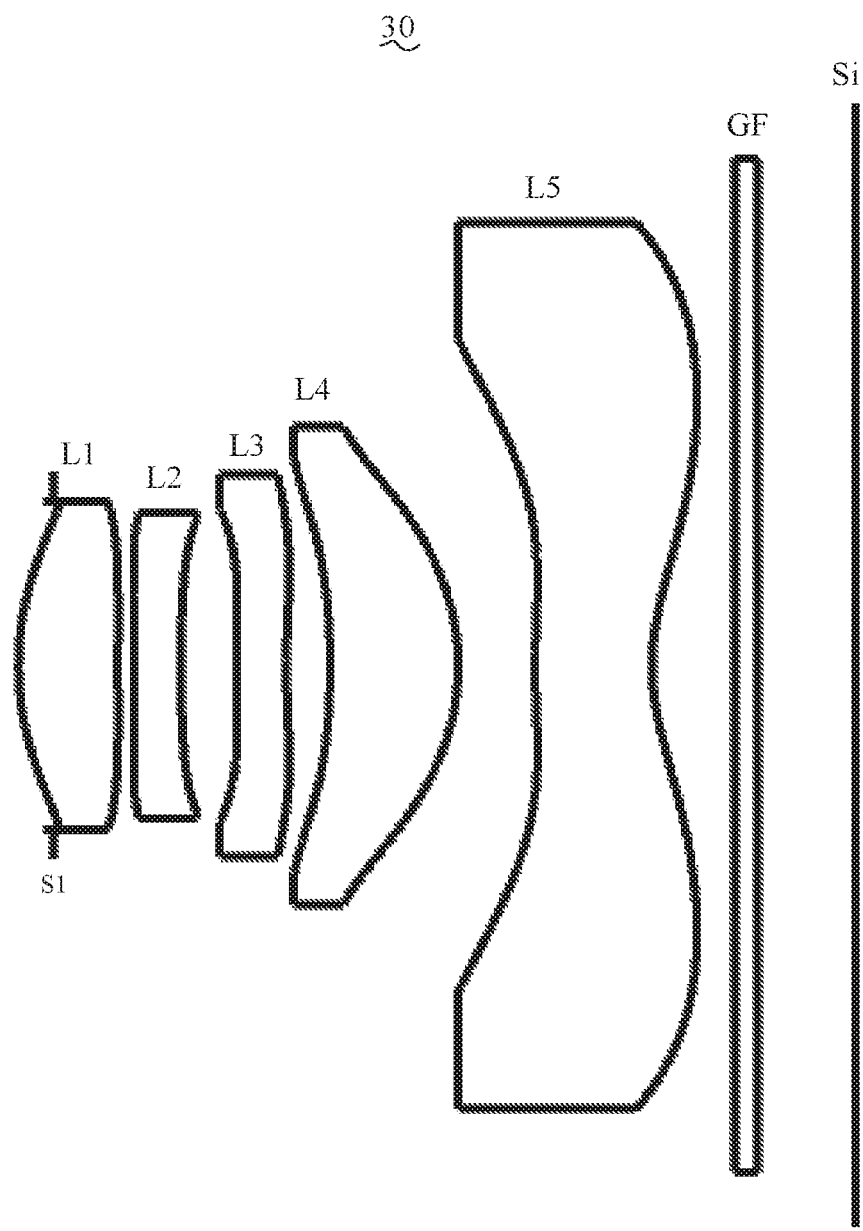
FIG. 9 is a schematic diagram of a structure of a camera optical lens according to Embodiment 3 of the present disclosure.

FIG. 9 is a schematic structural diagram of a camera optical lens 30 in Embodiment 3. Embodiment 3 is basically the same as Embodiment 1 and involves symbols in the following tables having the same meanings as Embodiment 1, so the same parts are not repeated here, and only the differences therebetween will be described in the following.

Table 9 and Table 10 show design data of a camera optical lens 30 in Embodiment 3 of the present disclosure.

TABLE 9

| | R | d | | nd | vd |
|---|---|---|---|---|---|
| S1 | ∞ | d0= | −0.175 | | |
| R1 | 1.455 | d1= | 0.493 | nd1 1.5444 | v1 55.82 |
| R2 | 20.899 | d2= | 0.083 | | |
| R3 | −18.620 | d3= | 0.230 | nd2 1.6610 | v2 20.53 |
| R4 | 7.418 | d4= | 0.276 | | |
| R5 | 7.479 | d5= | 0.248 | nd3 1.6153 | v3 25.94 |
| R6 | 4.179 | d6= | 0.216 | | |
| R7 | −3.383 | d7= | 0.635 | nd4 1.5444 | v4 55.82 |
| R8 | −1.200 | d8= | 0.381 | | |
| R9 | 3.409 | d9= | 0.581 | nd5 1.5346 | v5 55.69 |
| R10 | 1.069 | d10= | 0.415 | | |
| R11 | ∞ | d13= | 0.110 | ndg 1.5168 | vg 64.17 |
| R12 | ∞ | d14= | 0.482 | | |

TABLE 10

| | Conic coefficient | Aspherical surface coefficients | | | |
|---|---|---|---|---|---|
| | k | A4 | A6 | A8 | A10 |
| R1 | −1.8283E+01 | 6.7710E−01 | −2.0312E+00 | 4.8373E+00 | −7.0378E+00 |
| R2 | −9.5657E+03 | −8.8960E−02 | −2.2829E−01 | 1.5864E+00 | −4.8396E+00 |
| R3 | 3.5611E+02 | −9.0853E−02 | 6.5780E−01 | −7.8895E−01 | 7.8829E−01 |
| R4 | −2.8901E+02 | 6.3406E−02 | 2.1304E−01 | 1.8969E−01 | 5.5074E+00 |
| R5 | −2.5651E+01 | −3.2385E−01 | −1.0245E+00 | 7.5588E+00 | −2.8025E+01 |
| R6 | −1.5811E+02 | 1.6662E−02 | −1.2352E+00 | 4.2153E+00 | −8.3411E+00 |
| R7 | 2.1365E+00 | −4.2222E−02 | 8.9030E−02 | −5.6023E−01 | 1.2350E+00 |

TABLE 10-continued

| | | | | | |
|---|---|---|---|---|---|
| R8 | −2.3003E+00 | −2.3757E−01 | 4.6481E−01 | −9.5022E−01 | 1.2361E+00 |
| R9 | −1.1268E+02 | −2.9008E−01 | 2.0196E−01 | −8.7728E−02 | 2.3396E−02 |
| R10 | −6.0614E+00 | −1.3976E−01 | 8.8720E−02 | −4.1072E−02 | 1.2431E−02 |

| | Aspherical surface coefficients | | | | |
|---|---|---|---|---|---|
| | A12 | A14 | A16 | A18 | A20 |
| R1 | −1.7647E−01 | 2.3548E+01 | −4.8880E+01 | 4.5202E+01 | −1.6437E+01 |
| R2 | 2.9510E+00 | 1.9912E+01 | −5.8980E+01 | 6.6922E+01 | −2.8281E+01 |
| R3 | −3.7575E+00 | 1.5579E+01 | −3.2993E+01 | 3.6437E+01 | −1.6522E+01 |
| R4 | −5.2587E+01 | 2.0056E+02 | −4.0018E+02 | 4.1460E+02 | −1.7650E+02 |
| R5 | 5.7679E+01 | −5.3184E+01 | −1.3753E+01 | 6.8195E+01 | −3.9918E+01 |
| R6 | 8.0577E+00 | 2.1283E+00 | −1.3238E+01 | 1.1907E+01 | −3.6279E+00 |
| R7 | −1.7909E+00 | 2.6411E+00 | −2.7000E+00 | 1.3734E+00 | −2.5786E−01 |
| R8 | −8.8103E−01 | 1.8674E−01 | 2.5611E−01 | −2.2113E−01 | 5.3465E−02 |
| R9 | −2.4802E−03 | −5.0582E−04 | 2.0123E−04 | −2.1282E−05 | 5.2849E−07 |
| R10 | −2.3293E−03 | 2.2015E−04 | 5.9221E−07 | −2.0322E−06 | 1.2781E−07 |

Table 11 and Table 12 show design data inflexion points and arrest points of the respective lenses in the camera optical lens 30 according to Embodiment 3 of the present disclosure.

TABLE 11

| | Number(s) of inflexion points | Inflexion point position 1 | Inflexion point position 2 | Inflexion point position 3 |
|---|---|---|---|---|
| P1R1 | 1 | 0.665 | | |
| P1R2 | 1 | 0.155 | | |
| P2R1 | 1 | 0.335 | | |
| P2R2 | 0 | | | |
| P3R1 | 1 | 0.175 | | |
| P3R2 | 1 | 0.275 | | |
| P4R1 | 3 | 0.805 | 0.995 | 1.005 |
| P4R2 | 1 | 0.945 | | |
| P5R1 | 2 | 0.235 | 1.455 | |
| P5R2 | 1 | 0.515 | | |

TABLE 12

| | Number of arrest points | Arrest point position 1 |
|---|---|---|
| P1R1 | 0 | |
| P1R2 | 1 | 0.275 |
| P2R1 | 1 | 0.485 |
| P2R2 | 0 | |
| P3R1 | 1 | 0.295 |
| P3R2 | 1 | 0.475 |
| P4R1 | 0 | |
| P4R2 | 0 | |
| P5R1 | 1 | 0.425 |
| P5R2 | 1 | 1.325 |

Figure 10:
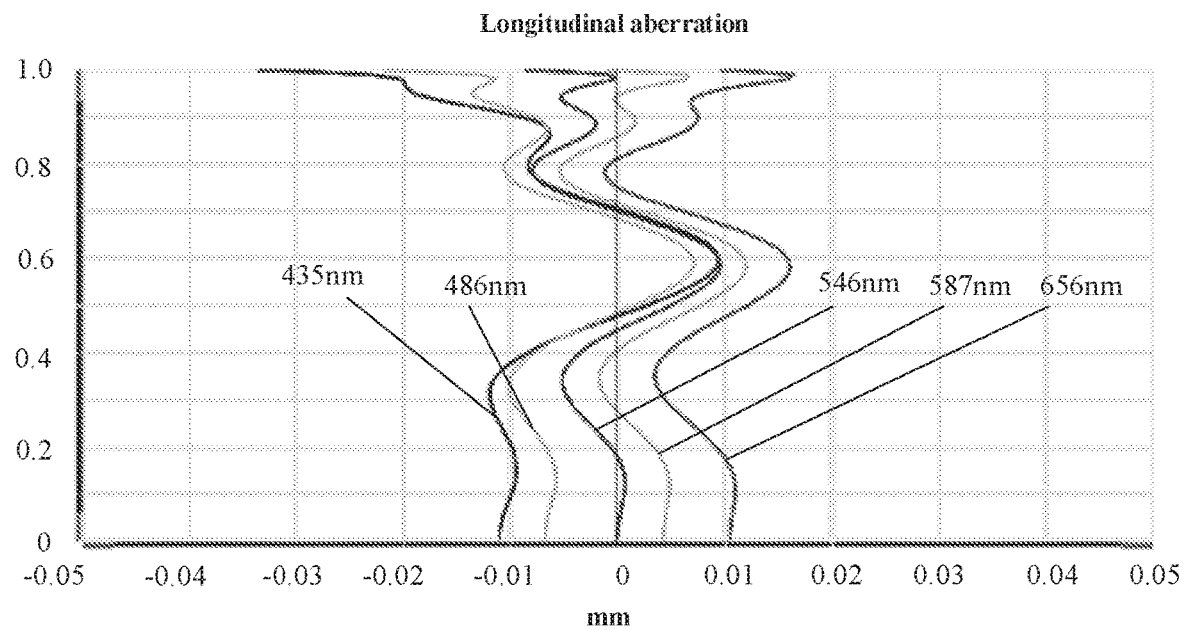
FIG. 10 is a schematic diagram of a longitudinal aberration of the camera optical lens shown in FIG. 9.
Figure 11:
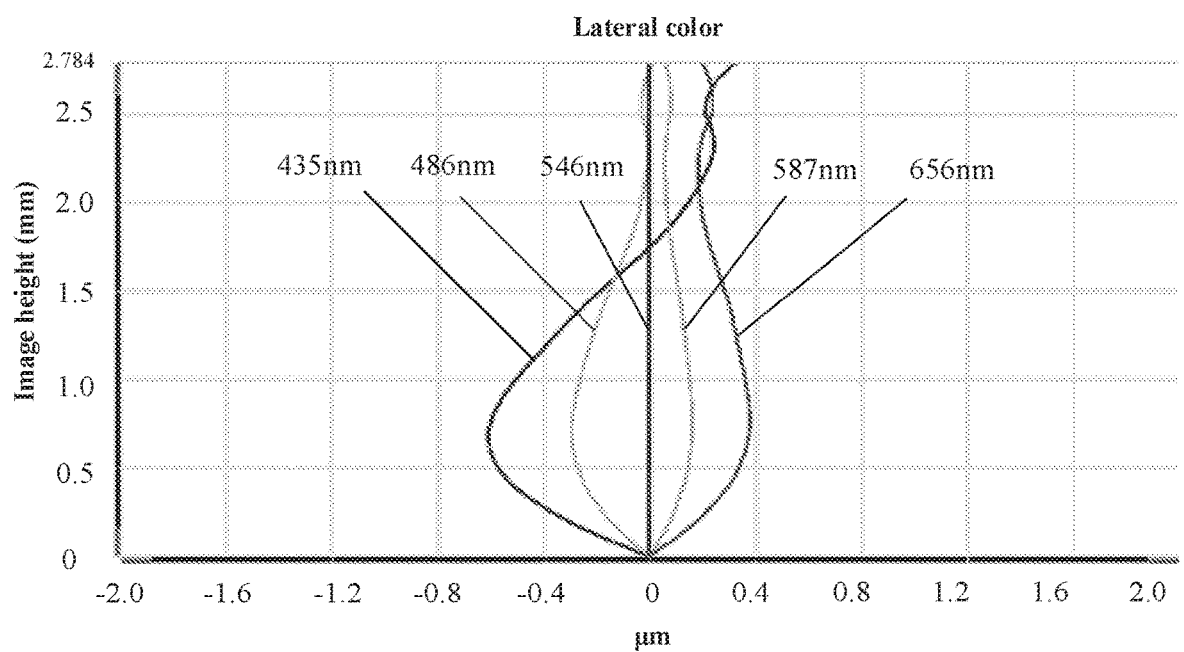
FIG. 11 is a schematic diagram of a lateral color of the camera optical lens shown in FIG. 9.
Figure 12:
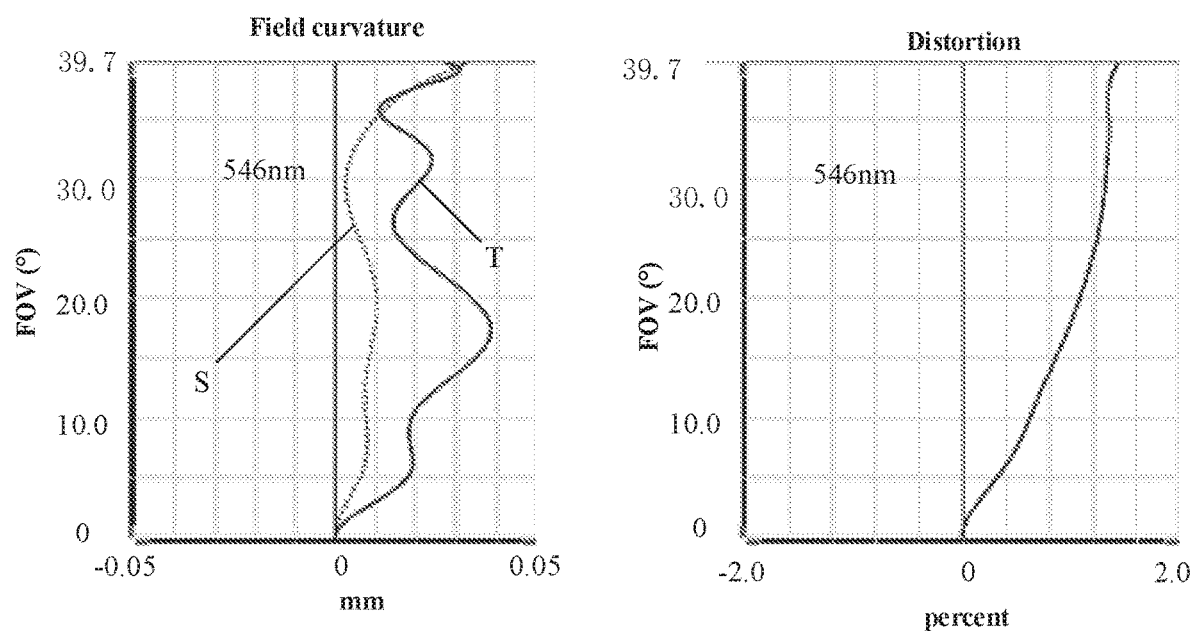
FIG. 12 is a schematic diagram of a field curvature and a distortion of the camera optical lens shown in FIG. 9.

FIG. 10 and FIG. 11 illustrate a longitudinal aberration and a lateral color with wavelengths of 435 nm, 486 nm, 546 nm, 587 nm and 656 nm after passing the camera optical lens 30 according to Embodiment 3, respectively. FIG. 12 illustrates a field curvature and a distortion with a wavelength of 546 nm after passing the camera optical lens 30 according to Embodiment 3. A field curvature S in FIG. 12 is a field curvature in a sagittal direction, and T is a field curvature in a tangential direction.

As shown in Table 13, Embodiment 3 satisfies the above conditions.

In this Embodiment, an entrance pupil diameter of the camera optical lens 20 is 1.639 mm, an image height of 1.0H is 2.784 mm, a FOV (field of view) in a diagonal direction is 79.40°. Thus, the camera optical lens 30 has a wide-angle and is ultra-thin. Its on-axis and off-axis aberrations are fully corrected, thereby achieving excellent optical characteristics.

The following table 13 lists the values of some conditions in Embodiment 1, Embodiment 2 and Embodiment 3 and the values of other related parameters according to the above conditions.

TABLE 13

| | Embodiment 1 | Embodiment 2 | Embodiment 3 |
|---|---|---|---|
| R1/R2 | 0.06 | 0.05 | 0.07 |
| R3/R4 | −3.18 | −3.55 | −2.51 |
| R5/R6 | 1.61 | 1.56 | 1.79 |
| R9/R10 | 3.05 | 2.82 | 3.19 |
| d8/d9 | 0.78 | 0.84 | 0.66 |
| d6/d8 | 0.58 | 0.59 | 0.57 |
| f | 3.279 | 3.270 | 3.266 |
| f1 | 2.728 | 2.811 | 2.834 |
| f2 | −6.709 | −6.881 | −7.907 |
| f3 | −20.532 | −18.060 | −15.703 |
| f4 | 2.828 | 3.046 | 3.082 |
| f5 | −2.882 | −3.192 | −3.175 |
| f12 | 4.033 | 4.216 | 4.006 |
| FNO | 2.00 | 2.00 | 1.99 |

The above description is merely embodiments of the present disclosure. It should be appreciated that, those of ordinary skills in the art may make improvements without departing from the inventive concept of the present disclosure, such improvements, however, fall within the protection scope of the present disclosure.

What is claimed is:

1. A camera optical lens comprising, from an object-side surface to an image-side surface:
   a first lens having a positive refractive power;
   a second lens having a negative refractive power;
   a third lens having a negative refractive power;
   a fourth lens having a positive refractive power; and
   a fifth lens having a negative refractive power;
   wherein the camera optical lens satisfies following conditions:
   $0.04 \leq R1/R2 \leq 0.07$;
   $-3.60 \leq R3/R4 \leq -2.50$;
   $1.55 \leq R5/R6 \leq 1.80$;
   $2.80 \leq R9/R10 \leq 3.20$;
   $0.65 \leq d8/d9 \leq 0.85$; and
   $0.56 \leq d6/d8 \leq 0.60$;

where

R1 denotes a curvature radius of an object-side surface of the first lens;
R2 denotes a curvature radius of an image-side surface of the first lens;
R3 denotes a curvature radius of an object-side surface of the second lens;
R4 denotes a curvature radius of an image-side surface of the second lens;
R5 denotes a curvature radius of an object-side surface of the third lens;
R6 denotes a curvature radius of an image-side surface of the third lens;
R9 denotes a curvature radius of an object-side surface of the fifth lens;
R10 denotes a curvature radius of an image-side surface of the fifth lens;
d6 denotes an on-axis distance from the third lens to the fourth lens;
d8 denotes an on-axis distance from the fourth lens to the fifth lens; and
d9 denotes an on-axis thickness of the fifth lens.

2. The camera optical lens according to claim 1 further satisfying following condition:

$2.80 \leq R7/R8 \leq 3.00$;

where

R7 denotes a curvature radius of an object-side surface of the fourth lens; and
R8 denotes a curvature radius of an image-side surface of the fourth lens.

3. The camera optical lens according to claim 1 further satisfying following conditions:

$0.06 \leq d1/TTL \leq 0.19$;
$-2.30 \leq (R1+R2)/(R1-R2) \leq -0.73$; and
$0.42 \leq f1/f \leq 1.30$;

where f denotes a focal length of the camera optical lens;
f1 denotes a focal length of the first lens;
d1 denotes an on-axis thickness of the first lens; and
TTL denotes a total optical length from the object-side surface of the first lens to an image surface of the camera optical lens along an optical axis.

4. The camera optical lens according to claim 1 further satisfying following conditions:

$0.03 \leq d3/TTL \leq 0.08$;
$-4.84 \leq f2/f \leq -1.36$; and
$0.22 \leq (R3+R4)/(R3-R4) \leq 0.84$;

where f denotes a focal length of the camera optical lens;
f2 denotes a focal length of the second lens;
d3 denotes an on-axis thickness of the second lens; and
TTL denotes a total optical length from the object-side surface of the first lens to an image surface of the camera optical lens along an optical axis.

5. The camera optical lens according to claim 1 further satisfying following conditions:

$0.03 \leq d5/TTL \leq 0.11$;
$1.77 \leq (R5+R6)/(R5-R6) \leq 6.88$; and
$-12.52 \leq f3/f \leq -3.21$;

where f denotes a focal length of the camera optical lens;
f3 denotes a focal length of the third lens;
d5 denotes an on-axis thickness of the third lens; and
TTL denotes a total optical length from the object-side surface of the first lens to an image surface of the camera optical lens along an optical axis.

6. The camera optical lens according to claim 1 further satisfying following conditions:

$0.08 \leq d7/TTL \leq 0.26$;
$0.43 \leq f4/f \leq 1.42$; and
$1.01 \leq (R7+R8)/(R7-R8) \leq 3.15$;

where f denotes a focal length of the camera optical lens;
f4 denotes a focal length of the fourth lens;
R7 denotes a curvature radius of an object-side surface of the fourth lens;
R8 denotes a curvature radius of an image-side surface of the fourth lens;
d7 denotes an on-axis thickness of the fourth lens; and
TTL denotes a total optical length from the object-side surface of the first lens to an image surface of the camera optical lens along an optical axis.

7. The camera optical lens according to claim 1 further satisfying following conditions:

$0.05 \leq d9/TTL \leq 0.21$;
$-1.95 \leq f5/f \leq -0.59$; and
$0.96 \leq (R9+R10)/(R9-R10) \leq 3.15$;

where f denotes a focal length of the camera optical lens;
f5 denotes a focal length of the fifth lens; and
TTL denotes a total optical length from the object-side surface of the first lens to an image surface of the camera optical lens along an optical axis.

8. The camera optical lens according to claim 1 further satisfying following condition:

$TTL/IH \leq 1.50$;

where

TTL denotes a total optical length from the object-side surface of the first lens to an image surface of the camera optical lens along an optical axis; and
IH denotes an image height of the camera optical lens.

9. The camera optical lens according to claim 1 further satisfying following condition:

$0.61 \leq f12/f \leq 1.93$;

where f12 denotes a combined focal length of the first lens and second lens; and
f denotes a focal length of the camera optical lens.

* * * * *